United States Patent

Samman

Patent No.: US 9,643,145 B2
Date of Patent: May 9, 2017

(54) PRESSURE VESSEL RESTRAINT FOR ACCOMMODATING THERMAL CYCLING

(71) Applicant: Houston Engineering Solutions, LLC, Houston, TX (US)

(72) Inventor: Mahmod Samman, Houston, TX (US)

(73) Assignee: Houston Engineering Solutions, LLC, Houston, TX (US)

( * ) Notice: Subject to any disclaimer, the term of this patent is extended or adjusted under 35 U.S.C. 154(b) by 466 days.

(21) Appl. No.: 14/227,678

(22) Filed: Mar. 27, 2014

(65) Prior Publication Data

US 2015/0273422 A1 Oct. 1, 2015

(51) Int. Cl.
*C10B 29/04* (2006.01)
*B01J 3/04* (2006.01)
*B01J 3/00* (2006.01)

(52) U.S. Cl.
CPC ............... *B01J 3/04* (2013.01); *B01J 3/002* (2013.01); *C10B 29/04* (2013.01)

(58) Field of Classification Search
CPC .. B01J 3/002; B01J 3/04; C10G 9/005; C10G 2300/708; C10B 29/08; G21C 13/024; G21C 13/04
USPC .............. 220/655, 560.05, 560.07, 567.2; 202/268, 226; 52/393
See application file for complete search history.

(56) References Cited

U.S. PATENT DOCUMENTS

| 4,133,094 | A | 1/1979 | Stafford | |
|---|---|---|---|---|
| 5,628,603 | A | 5/1997 | Antalffy et al. | |
| 5,804,038 | A | 9/1998 | Nelsen | |
| 5,930,320 | A * | 7/1999 | Challberg | G21C 13/02 376/285 |
| 6,206,059 | B1 | 3/2001 | Maakad et al. | |
| 7,131,618 | B2 | 11/2006 | Berry et al. | |
| 7,666,279 | B2 * | 2/2010 | Cihlar | F16J 12/00 202/239 |
| 7,871,500 | B2 * | 1/2011 | Lah | C10B 1/04 202/266 |
| 8,317,981 | B2 * | 11/2012 | Sasaki | C10B 1/04 202/266 |
| 8,440,057 | B2 | 5/2013 | Lah | |
| 2010/0059357 | A1 * | 3/2010 | de Para | C10B 1/04 202/266 |
| 2013/0284744 | A1 * | 10/2013 | Samman | B65D 25/00 220/480 |

* cited by examiner

Primary Examiner — In Suk Bullock
Assistant Examiner — Briana Obenhuber
(74) Attorney, Agent, or Firm — Patterson & Sheridan, L.L.P.

(57) ABSTRACT

A pressure vessel has a restraint structure for accommodating thermal cycling thereof, including: a body with a cylindrical section; a skirt connected to the body and having a foot; and a plurality of blocks disposed around the skirt adjacent to the foot. Each block is anchored to a support frame or foundation, and has a base and a flange. Each flange overlaps the foot, thereby vertically linking the blocks and the skirt. A radial clearance is formed between an outer surface of the foot and an inner surface of each base. A vertical clearance is formed between an upper surface of the foot and a lower surface of each flange.

12 Claims, 4 Drawing Sheets

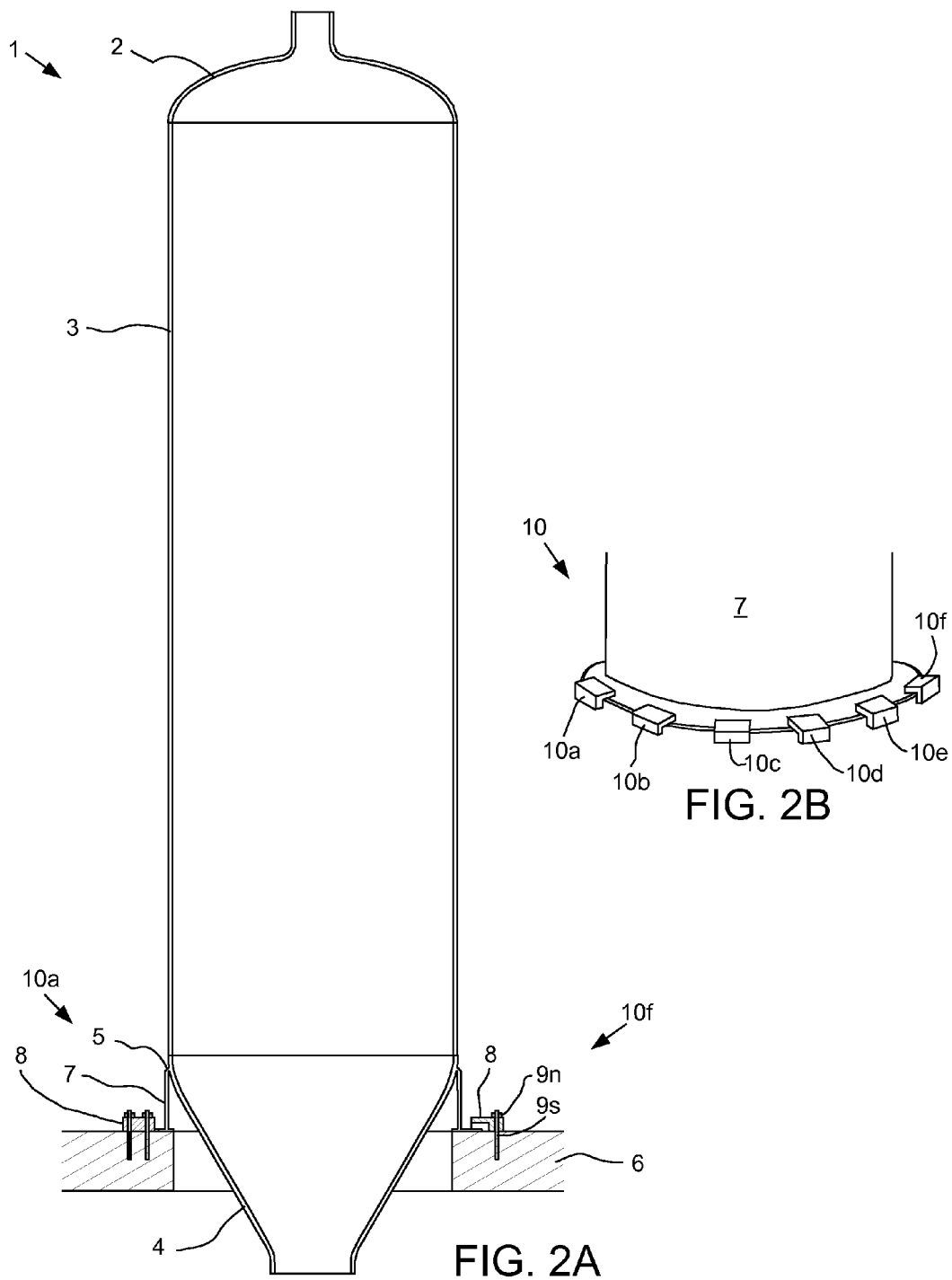

PRESSURE VESSEL RESTRAINT FOR ACCOMMODATING THERMAL CYCLING

BACKGROUND OF THE DISCLOSURE

Field of the Disclosure

The present disclosure generally relates to a pressure vessel restraint for accommodating thermal cycling.

Description of the Related Art

Delayed petroleum coking is a process in which a petroleum fraction is heated to a temperature at which it thermally decomposes to provide a solid coke product and a hydrocarbon distillate product. In general, a liquid petroleum feed stock is first distilled until the lighter ends have been recovered and a heavy residuum remains. This heavy residuum of heated pitch and cat-cracked heavy or cycle oil is charged to the bottom of a pressure vessel called a coke drum.

FIG. 1 illustrates a prior art coke drum support skirt. Coke drums are vertically-disposed pressure vessels that are commonly twelve to thirty-two feet in diameter with a thirty to over eighty-feet tall cylindrical section. A coke drum typically has a conical bottom section to provide uniformity of support stresses in the structure, and is supported by a skirt that is welded to or near a transition knuckle between the cylindrical section and the conical bottom section.

In the coke drum, the heavy residuum is further heated to one thousand degrees Fahrenheit or more and undergoes extensive and controlled cracking and coking under high-pressure conditions. A cracked lighter product rises to the top of the coke drum in a process called steam stripping and is drawn off. A heavier product remains and cracks to coke, a solid, coal-like substance. The coke is usually purged with steam to remove any remaining volatile components. After the cracking and coking process is complete, quench water is introduced and high-pressure water jets are used to cut away and remove the coke. The water reduces the temperature in the drum to around two hundred degrees Fahrenheit or less before a new cycle begins. In order to increase production speed, the quenching operation is often done as quickly as possible. The cycle time for a vessel is typically 48 hours or less.

The heating and quenching cyclic operations of vessels, such as coke drums, cause deterioration of the skirt structure over time. Vessels subjected to such extreme thermal cycling may experience a failure in the area where the support skirt is fastened to the pedestal.

A structure that is more resistant to cracking and other fatigue-related failures would be advantageous.

SUMMARY OF THE DISCLOSURE

The present disclosure generally relates to a pressure vessel chair for accommodating thermal cycling. In one embodiment, a pressure vessel has a restraint structure for accommodating thermal cycling thereof, including: a body with a cylindrical section; a skirt connected to the body and having a foot; and a plurality of blocks disposed around the skirt adjacent to the foot. Each block is anchored to a support frame or foundation, and has a base and a flange. Each flange overlaps the foot, thereby vertically linking the blocks and the skirt. A radial clearance is formed between an outer surface of the foot and an inner surface of each base. A vertical clearance is formed between an upper surface of the foot and a lower surface of each flange.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2A illustrates a coke drum, according to one embodiment of the present disclosure. FIG. 2B illustrates a restraint structure of the coke drum.

DETAILED DESCRIPTION

Figure 1:
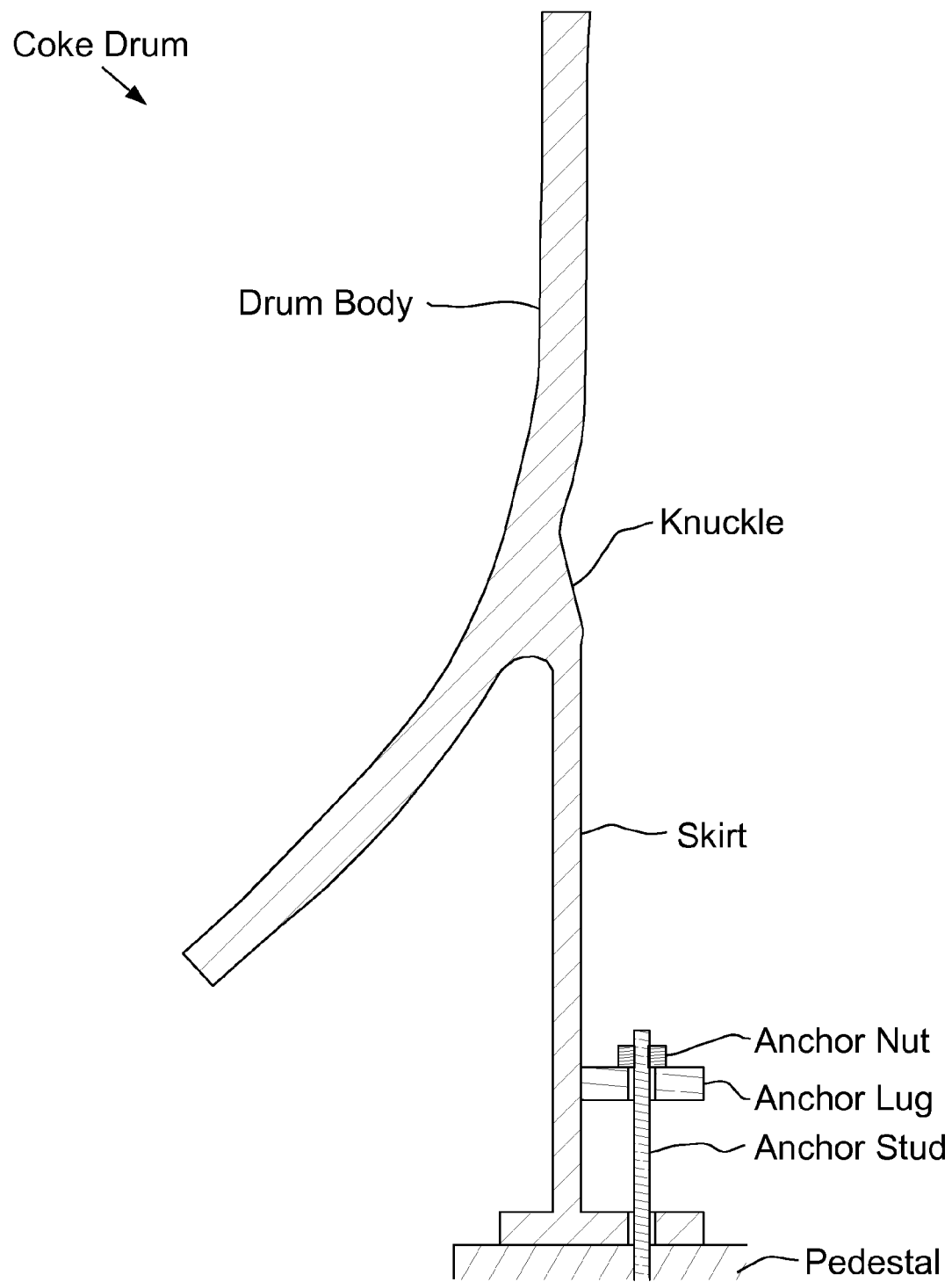
FIG. 1 illustrates a prior art coke drum support skirt.

FIG. 2A illustrates a coke drum 1, according to one embodiment of the present disclosure. FIG. 2B illustrates a restraint structure 10 of the coke drum 1. The coke drum 1 may include a cap 2, a cylindrical section 3, a bottom 4, a knuckle 5, a skirt 7, an inlet, an outlet, and a utility port, and a restraint structure 10. A body 2-4 of the drum 1 and the skirt 7 may be made from a metal or alloy, such as steel. The steel may be plain carbon, low alloy, or stainless. Alternatively, the metal or alloy may be special, such as a high alloy steel, a nickel based alloy, aluminum, aluminum based alloy, titanium, or a titanium based alloy. The skirt 7 may be made from the same or different metal or alloy than the body 2-4. The coke drum 1 may be vertically oriented. The cap 2 may each be welded or fastened to the cylindrical section 3. The knuckle 5 may connect the bottom 4 and the cylindrical section 3, such as by welding or fastening. The cap 2 may be hemispherical, hemi-ellipsoidal, or torispherical. Alternatively, the cap 2 may be a blind flange. The bottom 4 may be conical or a polygonal approximation thereof.

Alternatively, the restraint structure 10 may be used with any other kind of pressure vessel subject to thermal cycling, such as a heat exchanger, boiler, or reactor. The pressure vessel may have a design pressure greater than, equal to, or less than fifteen pounds per square inch gage (psig). The pressure vessel may or may not be designed according to local jurisdictional code, such as ASME Section VIII. The pressure vessel may have two caps (or blind flanges) instead of a cap and bottom. The caps and cylindrical section may each include a respective flange assembly (not shown). Each flange assembly may include a flange welded to the cylindrical section 3, a flange welded to the respective cap and bottom, a gasket (not shown), and fasteners (not shown) for connecting the two flanges, such as bolts or studs and nuts. Each flange assembly may be made from any of metals or alloys, discussed above.

A length to diameter ratio of the cylindrical section 3 may range from two to five. A thickness of the cylindrical section wall may be greater than or equal to one-half inch, such as ranging from three-quarters of an inch to three inches. The skirt 7 may be connected to the body 2-4 at the knuckle 5, such as by welding.

The restraint structure 10 may secure the skirt 7 to a structural frame or foundation, such as a pedestal 6, footing, or slab, while accommodating thermal cycling of the body 2-4. The restraint structure 10 may secure the body 2-4 against toppling and/or twisting, such as due to wind loading and/or thermal cycling of connected piping. The restraint structure 10 may also secure the body 2-4 against a seismic event. The restraint structure 10 may include a plurality of restraints 10a-f spaced around the skirt 7. The restraints 10a-f may be spaced around the skirt 7 at regular intervals, such as three restraints spaced at one hundred twenty degrees, four restraints spaced at ninety degrees, five restraints spaced at seventy-five degrees, six restraints spaced at sixty degrees, etc. Alternatively, the restraints 10a-f may be irregularly spaced around the skirt 7. Each restraint 10a-f may be identical and include a block 8 and one or more fasteners 9n,s anchoring the block to the pedestal 6. The fasteners 9n,s may include one or more threaded fasteners, such as studs 9s received in respective threaded sockets of the pedestal 6 and nuts 9n securing the block 8 to the respective stud. Alternatively or additionally, the studs 9s may be welded to the pedestal 6.

Figure 3A:
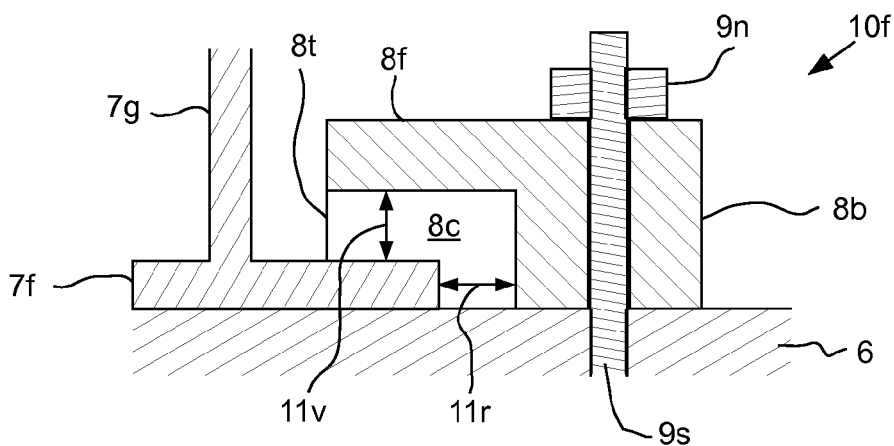
FIGS. 3A-3C illustrate a restraint of the structure.
Figure 3B:
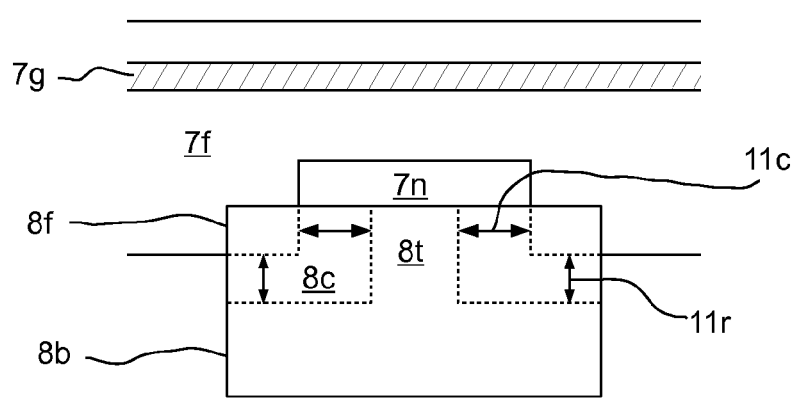
Figure 3C:
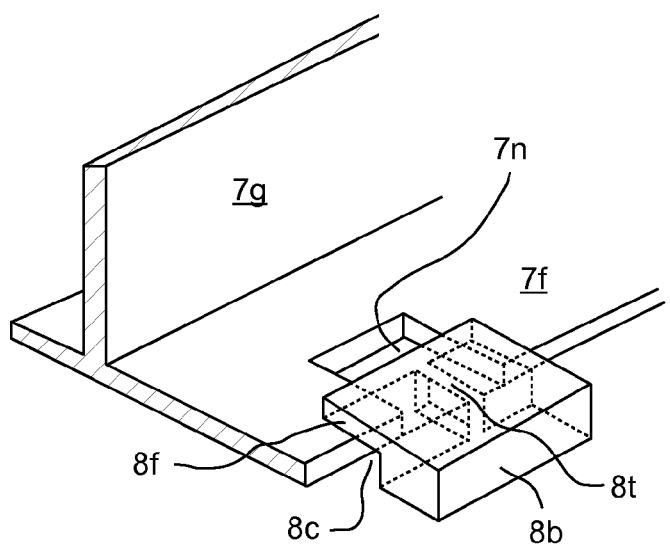
Figure 4A:
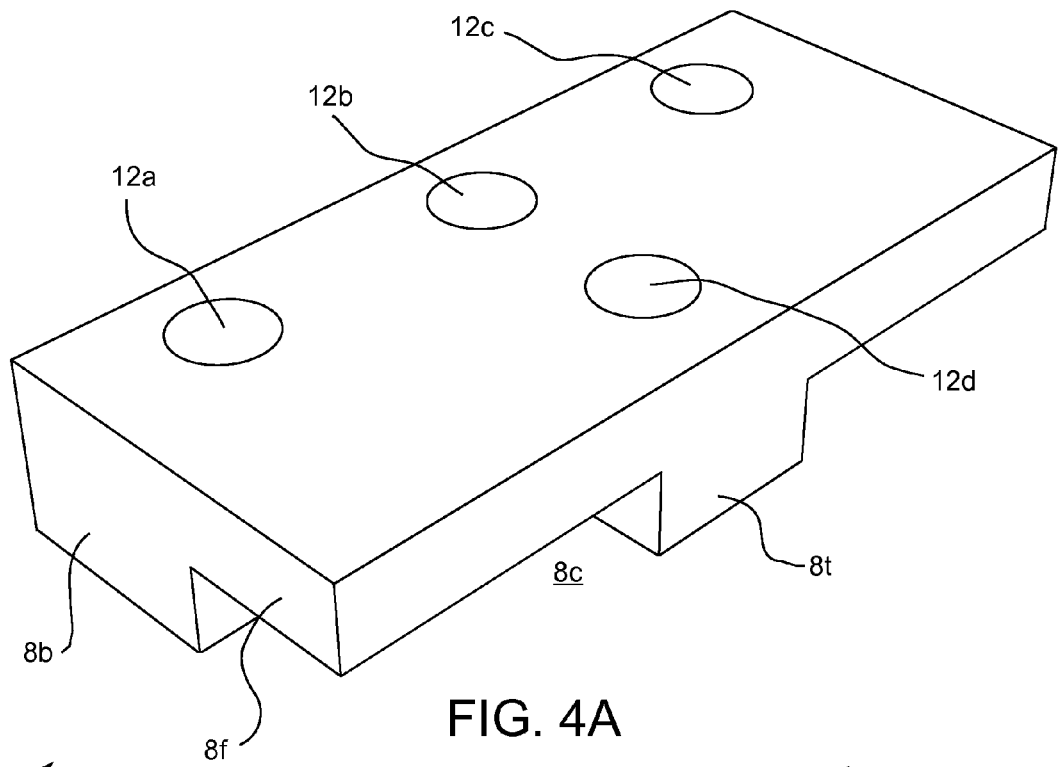
FIGS. 4A and 4B illustrate a block of the restraint.
Figure 4B:
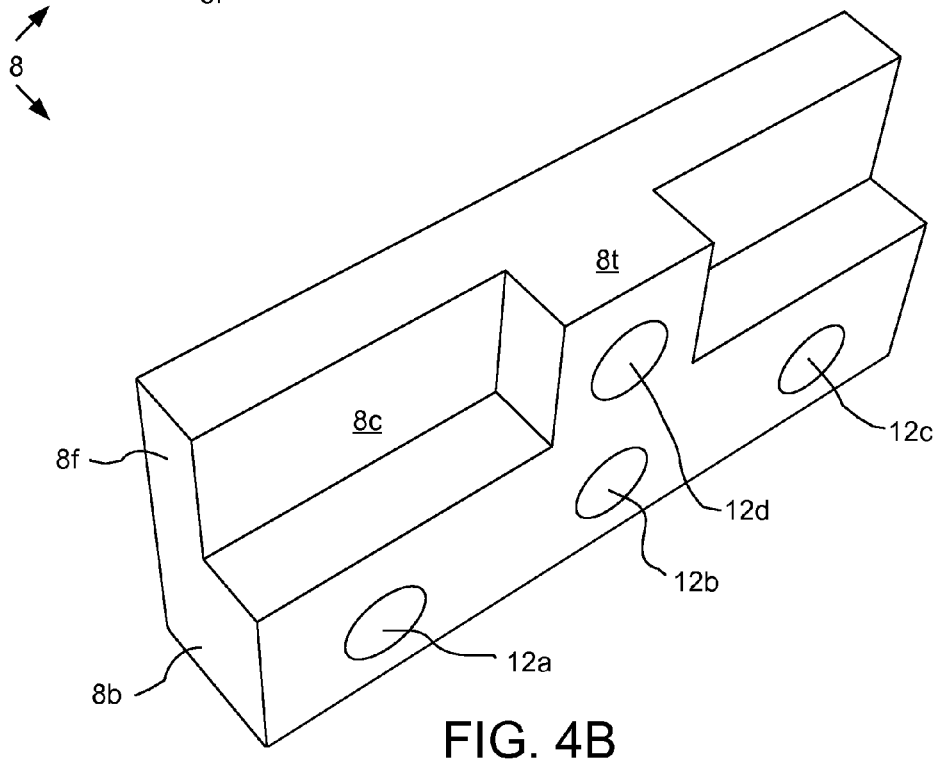

FIGS. 3A 3C illustrate a restraint 10f of the structure 10. FIGS. 4A and 4B illustrate a block 8 of the restraint 10f. Each block 8 may be unitary and rectangular and made from structural steel. Alternatively, each block 8 may be made from any of the body/skirt materials, discussed above. Alternatively, each block 8 may be arcuate and/or made from a plurality of plates connected together, such as by fastening or welding. Each block 8 may have a base 8b, a flange 8f, and a tooth 8t. The flange 8f may extend inwardly from an upper portion of the base 8b toward the skirt 7 and the tooth 8t may extend inwardly from a lower portion of the base 8b toward the skirt 7 and extend downwardly from the flange 8f. The tooth 8t may be defined by a pair of cavities 8c straddling the tooth, each cavity formed in an inner and lower surface of the block 8.

The skirt 7 may be annular and have a leg 7g and a foot 7f. Alternatively, the skirt may be a segmented ring. The skirt 7 may also have a notch 7n formed in an outer surface of the foot 7f for each restraint 10a-f. The restraints 10a-f may be anchored 9n,s to the pedestal 6 adjacent to the foot 7f such that each tooth 8t is partially received in the respective notch 7n, thereby torsionally linking the restraint structure 10 and the skirt 7. Each flange 8f may overlap the foot 7f, thereby vertically linking the restraint structure 10 and the skirt 7. The cavities 8c may each partially receive the foot outer surface, thereby radially linking the restraint structure 10 and the skirt 7.

To accommodate thermal cycling, a radial clearance 11r may be formed between the foot outer surface and the base inner surface, a vertical clearance 11v may be formed between the foot upper surface and the flange lower surface, and circumferential clearances 11c may be formed between the tooth 8t and each opposing surface of the notch 7n. The radial clearance 11r may accommodate radial expansion of the skirt 7 due to radial expansion of the drum body 2-4. The circumferential clearance 11c may accommodate circumferential expansion of the skirt 7 due to circumferential expansion of the drum body 2-4. The vertical clearance 11v may accommodate vertical expansion of the skirt 7 due to vertical expansion of the drum body 2-4. The clearances 11c,r,v may each be sized to accommodate the thermal cycling of the drum body 2-4 while still securing the skirt 7 to the pedestal 8 sufficiently to resist lateral and torsional loading on the coke drum 1.

The blocks 8 may each have one or more holes 12a-d formed therethrough and staggered thereabout for receiving the respective anchor studs 9s. The base portion may have a row of the holes 12a-c and the tooth 8t may have a hole 12d such that the respective stud 9s extends into the pedestal 6 through the respective notch 7n.

The restraint structure 10 may be used for newly constructed coking units or retrofit to coke drums of existing units. To retrofit an existing coke drum, the anchor nuts and studs may be removed from the skirt and pedestal. The notches 7n may be cut into the skirt foot 7f, new anchor studs 9s may be connected to the pedestal 6, and the blocks 8 anchored to the pedestal using the new anchor nuts 9n.

While the foregoing is directed to embodiments of the present disclosure, other and further embodiments of the disclosure may be devised without departing from the basic scope thereof, and the scope of the invention is determined by the claims that follow.

The invention claimed is:

1. A pressure vessel having a restraint structure for accommodating thermal cycling thereof, comprising:
a body comprising a cylindrical section;
a skirt connected to the body and having a foot; and
a plurality of blocks disposed around the skirt adjacent to the foot, each block:
   anchored to a support frame or foundation, and
   having a base and a flange,
wherein:
   each flange overlaps the foot, thereby vertically linking the blocks and the skirt,
   a radial clearance is formed between an outer surface of the foot and an inner surface of each base,
   a vertical clearance is formed between an upper surface of the foot and a lower surface of each flange; and
wherein:
   the skirt has a plurality of notches formed in the foot,
   each block further has a tooth defined by a pair of cavities straddling the tooth, and
   each tooth is partially received in the respective notch, thereby torsionally linking the blocks and the skirt.

2. The pressure vessel of claim 1, wherein:
the cavities each partially receive the foot outer surface, thereby radially linking the blocks and the skirt, and
circumferential clearances are formed between each tooth and each respective opposing surface of the notch.

3. The pressure vessel of claim 2, wherein:
the blocks are anchored to the support frame or foundation by fasteners, and
each block has a plurality of holes formed through the base and a hole formed through the tooth for receiving the respective fasteners.

4. The pressure vessel of claim 1, wherein:
the blocks are anchored to the support frame or foundation by fasteners, and
each block has a plurality of holes formed through the base for receiving the respective fasteners.

5. The pressure vessel of claim 1, wherein the blocks are spaced around the skirt at regular intervals.

6. The pressure vessel of claim 5, wherein the plurality of blocks includes at least three blocks.

7. The pressure vessel of claim 1, wherein each block is unitary.

8. The pressure vessel of claim 1, wherein each block is rectangular.

9. The pressure vessel of claim 1, wherein each block is made from a metal or alloy.

10. The pressure vessel of claim 9, wherein each block is made from structural steel.

11. The pressure vessel of claim 1, wherein:
the pressure vessel is a vertically oriented coke drum,
the body further comprises a cap, a conical bottom, and a knuckle connecting the conical bottom and the cylindrical section, and
the skirt is welded to the body at the knuckle.

12. A pressure vessel having a restraint structure for accommodating thermal cycling thereof, comprising:
a body comprising a cylindrical section;

a circumferential skirt connected to the body at an upper end and having a circumferential foot, the foot having a plurality of notches formed around the perimeter thereof; and a plurality of blocks disposed around the skirt adjacent to the foot, each block constructed and arranged to anchor the circumferential foot of the skirt to an independent supporting member, wherein each block includes:

a base attachable to the supporting member;

a flange, each flange overlapping the circumferential foot and leaving a vertical clearance between the flange and the foot;

a tooth, the tooth formed on a lower surface of the base and constructed and arranged to extend partially into a one of the plurality of notches formed in the foot of the skirt wherein a circumferential clearance is formed between sides of the tooth and sides of the notch; and a radial clearance formed between an outer surface of the foot and an inner surface of each base.

* * * * *